Patented May 10, 1932

1,857,430

UNITED STATES PATENT OFFICE

LEE H. CLARK, OF HAVERFORD, PENNSYLVANIA

MANUFACTURE OF CHOCOLATE

No Drawing. Application filed October 20, 1927. Serial No. 227,621.

This invention relates to the manufacture of chocolate and particularly to a method for producing chocolate of a high grade, and to the product thereby produced.

In the manufacture of chocolate the husk and the germ of the bean are removed so far as practicably possible from the nib. In these operations the degree to which the husk and germ are removed is a compromise between complete removal thereof, which would result in considerable loss of valuable parts of the nib, and as complete a recovery of the nib as possible, which would result in carrying excessive quantities of husk and germ into the finished chocolate. In any chocolate plant the result of this operation will depend upon the type and condition and adjustment and care of operation of the separating machinery. Then the bean so prepared is subjected to what is commonly known as a milling operation to produce chocolate liquor. But, chocolate liquor so produced possesses several undesirable characteristics. It contains particles of husk and germ that are more difficult to reduce to a desired degree of fineness and which interfere with the reduction of particles of the nib itself to a desired degree of fineness. These particles of husk and germ are undesirable constituents of chocolate even when reduced to a proper degree of fineness, because they impart hardness and grittiness to the chocolate and impair its flavor, the germ in particular being bitter. Chocolate liquor ordinarily contains undesirably coarse particles of the nib itself which may be reduced to a desired degree of fineness by milling and which are then a desirable constituent of the chocolate. These coarse particles of the nib itself contain cocoa butter but the fibrous constituent of them, free of fat, may be designated as cocoa fiber, which is a desirable constituent of chocolate when properly ground.

The chocolate liquor so produced in prior practice constitutes an article of commerce which might be sold as it is or further treated in the same plant. It is necessary to add cocoa butter to such chocolate liquor in the manufacture of almost all chocolate candies and coatings; and sugar, flavoring materials and milk solids in one form or another are added to impart to the chocolate special characteristics, dependent upon the final product desired. In order to obtain such an additional quantity of cocoa butter it is necessary to use a part of the chocolate liquor, pressing out the cocoa butter and leaving a cocoa cake. The addition of cocoa butter, sweetening, flavoring and milk solids to the chocolate liquor is accomplished in a mixing operation that involves further grinding in the prior practice. The next usual step is a finishing operation which involves mainly an extensive passing of the mixture through rolls to produce a completely finished chocolate. At best these operations can only grind to a fine state the undesirable fibrous constituents which are of such nature, particularly such parts as are derived from the husk and germ, as to impart a coarse and gritty character and a bitter taste to the chocolate which cannot be eliminated by grinding or completely covered up by the addition of cocoa butter; and the hard particles are always present to interfere with the grinding of the softer particles. Thus, while the chocolate contains undesirable constituents the cake produced in the pressing operation contains a considerable fraction of the desirable solids of the nibs, and these desirable solids go into the cocoa that is produced by grinding the cake. Moreover, the pressing of chocolate liquor to obtain cocoa butter involves the pressing of a substance that is relatively low in solids, producing a relatively thin cake, and the operation is thereby rendered difficult and inefficient.

The objects of my invention are to provide a chocolate making process in which the difficulties and defects in the known practice of producing high grade chocolate are avoided or minimized, and to produce a product in which the defects of chocolate, made in accordance with known practice, are minimized or eliminated.

In the accomplishment of these objects, a feature of my invention consists in removing from the chocolate liquor the denser and larger fibrous or solid particles, and thereby producing a chocolate liquor that is relatively free of grit or hard particles and large fibrous particles but contains substantially all desirable fibrous material in finely ground state. And, due to the removal of such undesirable solid particles the resulting chocolate liquor will contain cocoa butter in a greater proportion than it existed in the chocolate liquor from which such solids were removed. Thus, in the practice of my invention, the original chocolate liquor may be divided into one fraction that contains substantially all of the solids that are undesirable because of density, hardness, coarseness or bitterness, and a second fraction consisting of chocolate that is of such character that it is suitable as the chocolate constituent of a finished coating chocolate, requiring only the addition of sweetening and flavoring constituents. In chocolate so produced by my process, e. g., in such a second fraction, the ratio of desirable solids to undesirable solids is greater than in the unseparated liquor, and the ratio of butter to the total mass is greater than in the unseparated liquor and is, within limits, variable at the will of the operator of my process. Thus, as a convenience, in the practice of my process, the separation of chocolate liquor into such fractions may be carried out in such a manner that such a second fraction will contain cocoa butter in a proportion suitable for lower grade coating chocolate, and to such chocolate cocoa butter may be added to produce coating material for candies of higher grade. I have found that such a removal of undesirable solid particles from chocolate liquor and such a separation of chocolate liquor into fractions can be effected by centrifugal separation although it cannot be efficiently performed otherwise.

If cocoa butter is to be added to the fraction of chocolate liquor freed of undesirable solids in accordance with my invention, such cocoa butter may be obtained by pressing the fraction which contains the undesirable solids. Advantageously the fraction containing undesirable solids is reground before such a pressing operation, and such a grinding operation is relatively economical because the coarse particles are ground in the absence of all of the material constituting the fraction of chocolate liquor that is freed of solids. In other words it is obviously more economical to isolate insufficiently ground particles and then regrind them than it is to grind coarse particles in the presence of properly ground material. In fact the last part of the grinding operations of prior practice in chocolate making, as in all grinding operations, is the most difficult and extensive and it is minimized or eliminated in the practice of my invention, and the reduction of coarse particles to a fine state, if any grinding is carried out after the separating operation of my invention, is performed in a separate operation that is readily carried out. Any further grinding of chocolate liquor substantially freed of hard particles will be very effective, because the absence of such particles permits complete and rapid grinding of the cocoa fiber. Furthermore, the pressing of that fraction of the chocolate liquor which is high in solids requires the pressing of a smaller quantity of material and the pressing operation is simple because the material pressed contains a high fraction of solids. The cake produced contains a smaller fraction of desirable solids, such as the cocoa fiber, than the cake produced in prior practice by the pressing of chocolate liquor itself.

Thus, in the practice of my invention chocolate of high quality is obtained in a substantially single operation and is relatively free of undesirable solids and possesses an unusually high ratio of desirable solids such as cocoa fiber to undesirable solids and also the ratio of cocoa butter to solids is higher than it is in chocolate liquor of prior practice. And, the separating operation may be so adjusted that the chocolate freed of undesirable solids contains different proportions of cocoa butter, and the fraction containing undesirable solids can be made relatively small and cocoa butter contained therein is readily recovered therefrom. This possibility of varying the character and quantity of the products produced facilitates adapting the output of the plant to market conditions. The chocolate freed of undesirable solids requires a small proportion of cocoa butter in order that it may possess the same smoothness as chocolate produced by former processes and if it contains the same proportion of cocoa butter as chocolate produced by prior practice it is smoother than the chocolate made by prior practice. Moreover, an additional reason for adding cocoa butter in prior practice was to dilute flavor-impairing qualities of undesirable solids.

It is intended that my process shall apply to chocolate liquor that is the result of coarse grinding, medium grinding and fine grinding of the bean, and also to chocolate liquor to which cocoa butter has been added, since more accurate separation of fine material from coarse material is possible in such a mixture; and that it will apply regardless of whether special steps have been taken for the removal of the germ or husk.

For the purpose of illustrating and further disclosing the practice of my invention, but with the understanding that my invention is not limited thereto, I will now describe an example of the production of chocolate in accordance therewith:

Cocoa bean freed of husk and germ in the usual manner and to an extent common in the production of high grade cholocate was subjected to a coarse grinding in a usual milling operation. The chocolate liquor so produced and at a temperature sufficiently high to maintain the cocoa butter in a state in which it will flow was subjected to the centrifugal separating treatment in an imperforate centrifugal bowl wherein undesirable solids were formed into a cake by sedimentation and the cake was retained in the bowl while chocolate liquor freed of undesirable solids was centrifugally discharged therefrom.

The amount of solid matter in the original chocolate liquor and in the refined chocolate liquor and in the resultant cake was determined by the use of petroleum ether as a solvent.

The original chocolate liquor contained 45% or more of solid matter which felt coarse and gritty when tested between the teeth and on the tongue. The cake formed in the centrifugal bowl contained 62½% of solid matter which appeared much coarser as a whole to the naked eye and was much more gritty between the fingers than the solid matter from the original chocolate liquor, and, when tested between the teeth and the tongue, it was relatively very gritty and coarse as compared with the solid matter from the original chocolate liquor.

The chocolate discharged from the centrifuge contained less than 40% of solid matter which was finer and less gritty, when tested between the teeth and on the tongue, than the solid matter obtained from the original chocolate liquor. The improvements in the character of the chocolate were obtained in the operation described by the use of a relatively low speed centrifuge and the improvements are obtainable to a more pronounced degree by the use of a high speed centrifuge, it being advantageous in any case to use a centrifuge in which the separation is effected by sedimentation.

From the foregoing it will be apparent that in the production of chocolate in accordance with my invention the step of removing undesirable solids from the chocolate liquor produced in the milling operation, a step not heretofore accomplished, produces a product that is a suitable chocolate constituent of finished coating chocolate, and in which a greater proportion of fibrous or solid substances present consists of the desirable fibrous substances of the bean, such as cocoa fiber, and which is superior to finished coating chocolate produced in prior practice because of the absence of coarse and hard and gritty and flavor-impairing solids. Even the dilution by addition of cocoa butter in prior practice only reduced the proportion of the undesirable solids and did not eliminate them, and it likewise diluted the proportion of cocoa fiber or flavor-giving constituents.

It is also to be noted that by removing from the chocolate liquor particles that are large, primarily because they are hard, any further grinding operation will efficiently grind the remaining relatively soft solids. While chocolate obtained by removing undesirable solids from chocolate liquor constitutes a suitable chocolate constituent of a finished coating, it is apparent that application of the grinding that is practised in the mixing and finishing steps of prior practice will produce, in less time than was consumed by those operations in prior practice, a chocolate of higher grade than is obtainable by present practice.

I claim:

1. In the manufacture of chocolate the step consisting of removing from the chocolate liquor by centrifugal subsidence undesirably hard and gritty solid constituents.

2. In the manufacture of chocolate the process comprising grinding cocoa bean to produce chocolate liquor, and then removing from the chocolate liquor husk and germ particles while retaining therein cocoa fiber and thereby obtaining finished chocolate by subjecting the chocolate liquor to the influence of centrifugal force at a temperature at which the cocoa butter therein is in a fluid state and continuously discharging such finished chocolate from the influence of centrifugal force separate from husk and germ particles removed therefrom by the action of centrifugal force.

3. In the manufacture of chocolate the process comprising grinding cocoa bean and thereby producing chocolate liquor, and then by centrifugal subsidence separating the chocolate liquor into a fraction containing the major portion of hard and gritty solids, and a fraction substantially freed of hard and gritty solids and containing cocoa butter and cocoa fiber.

4. In the manufacture of chocolate, separating chocolate liquor by centrifugal subsidence into a fraction containing the major portion of the hard and gritty solids, and a fraction substantially free of hard and gritty solids and containing cocoa fiber and cocoa butter, withdrawing cocoa butter from the first-named fraction by pressing, and combining the cocoa butter with the second-named fraction.

5. In the manufacture of chocolate, separating chocolate liquor by centrifugal subsidence into a fraction containing the major portion of the hard and gritty solids and larger particles of cocoa fiber, and a fraction substantially free of hard and gritty solids and containing cocoa fiber and cocoa butter, subjecting the first fraction to further grinding, withdrawing cocoa butter from the ground material by pressing and combining the cocoa butter with the first fraction.

6. In the manufacture of chocolate the step comprising adding cocoa butter to chocolate liquor, and centrifugally separating the mixture into a fraction substantially free of husk and germ particles, and containing cocoa butter and cocoa fiber, and a fraction containing husk and germ particles and larger particles of the nib.

7. In the manufacture of chocolate products, the steps consisting of grinding cocoa bean to produce chocolate liquor, centrifugally separating the chocolate liquor by sedimentation into a fraction substantially free of hard and gritty solids of the cocoa bean and containing cocoa butter and cocoa fiber, and a fraction containing the major portion of the hard and gritty solids of the bean, and employing said first fraction in the manufacture of chocolate.

8. In the treatment of chocolate liquor resulting from grinding the cocoa bean, the steps comprising continuously passing said chocolate liquor into the influence of centrifugal force and thereby separating the liquor into a fraction containing an increased proportion of butter and a fraction containing an increased proportion of hard and gritty solids, continuously withdrawing said first fraction from the influence of centrifugal force, and regulating the rate of withdrawal of said first fraction to control the proportion of butter therein.

9. In the treatment of chocolate liquor resulting from grinding of cocoa bean, the steps comprising continuously passing such chocolate liquor into the influence of centrifugal force and by sedimentation due to the action of centrifugal force separating the liquor into a fraction containing a greater proportion of hard and gritty solids than is contained in the original chocolate liquor and a fraction containing a lesser proportion of hard and gritty solids than is contained in the original chocolate liquor, and continuously withdrawing said second fraction from the influence of centrifugal force while retaining said first fraction within the influence of centrifugal force, and employing said second fraction so withdrawn and separate from said first fraction in the manufacture of chocolate.

10. In the manufacture of chocolate products, the steps consisting of grinding cocoa bean to produce chocolate liquor, centrifugally separating the chocolate liquor by sedimentation into a fraction substantially free of hard and gritty solids of the cocoa bean and containing cocoa butter and cocoa fiber, and a fraction containing the major portion of the hard and gritty solids of the bean, and employing said second fraction in the production of cocoa.

In testimony whereof, I have signed my name to this specification.

LEE H. CLARK.